(12) United States Patent
Warren et al.

(10) Patent No.: US 6,533,256 B1
(45) Date of Patent: Mar. 18, 2003

(54) HIGH PRECISION VIBRATION DAMPING SYSTEM

(75) Inventors: Peter A. Warren, Newton, MA (US); Lee D. Peterson, Boulder, CO (US); Jason D. Hinkle, Lafayette, CO (US)

(73) Assignee: Foster-Miller, Inc., Waltham, MA (US)

( * ) Notice: Subject to any disclaimer, the term of this patent is extended or adjusted under 35 U.S.C. 154(b) by 0 days.

(21) Appl. No.: 09/602,505

(22) Filed: Jun. 23, 2000

(51) Int. Cl.[7] .................................................. F16M 9/00
(52) U.S. Cl. ........................ 267/136; 188/268; 248/580
(58) Field of Search .................................. 267/136, 267, 267/269, 153, 182, 257, 140.5, 49; 188/268, 379, 380, 321.11, 372; 248/560, 562, 580 621, 636, 638, 581, 569

(56) References Cited

U.S. PATENT DOCUMENTS

| | | |
|---|---|---|
| 1,294,467 A | 2/1919 | Hovas |
| 1,439,209 A | 12/1922 | Watson |
| 1,912,840 A | 6/1933 | Havill |
| 2,055,000 A * | 9/1936 | Bacigalupo ................ 52/167.6 |
| 2,280,429 A | 4/1942 | Glick |
| 2,460,292 A | 2/1949 | Ivanovic |
| 2,715,951 A | 8/1955 | Lieber |
| 3,244,393 A * | 4/1966 | Wallerstein, Jr. ............ 248/569 |
| 3,251,270 A | 5/1966 | Seifried |
| 3,730,463 A * | 5/1973 | Richard ...................... 248/580 |
| 3,938,625 A | 2/1976 | Radermacher et al. |
| 4,223,762 A * | 9/1980 | Gertal .................... 248/580 X |
| 4,330,103 A * | 5/1982 | Thuries et al. .......... 248/636 X |
| 4,402,483 A * | 9/1983 | Kurabayashi et al. ....... 248/636 |
| 4,491,184 A | 1/1985 | Kawaharazuka |
| 5,197,573 A | 3/1993 | De La Fuente et al. |
| 5,560,590 A * | 10/1996 | Reast ..................... 267/267 X |

* cited by examiner

Primary Examiner—Christopher P. Schwartz
Assistant Examiner—Melanie Torres
(74) Attorney, Agent, or Firm—Iandiorio & Teska (57) ABSTRACT

A damping system is disclosed which includes a housing that receives vibrations, a mounting platform movably disposed with respect to the housing, at least one bearing surface on or attached to one of the housing and the platform, and at least one frictional member on or attached to the other of the housing and the platform in contact with the bearing surface. The system frictionally dampens vibrations received by the housing and isolates the platform from vibrations.

38 Claims, 8 Drawing Sheets

HIGH PRECISION VIBRATION DAMPING SYSTEM

FIELD OF INVENTION

This invention relates generally to a damping system, and more particularly to a system for reducing vibrations at very low levels of motion.

BACKGROUND OF INVENTION

In the field of very-long-range optical instruments, particularly in the case of optical instruments used on spacecraft, it is essential to reduce vibrations which can interfere with the operation of the optical instrument, since the performance of such instruments depends on maintaining the precision and stability of the instruments to within nanometers of the ideal shape of the instrument. Friction and freedom in the joints of deployed structures have the capacity to change the shape of the instrument at the micron and nanometer levels of resolution. These shape changes can induce low level transient shocks and persistent vibrations that perturb the instrument's optics and reduce or destroy the quality of the scientific observation. These vibrations cause the departure of structures and mechanisms from ideal linear behavior with very small, often nanometer level, deformations.

In order to reduce or eliminate these vibrations, the optical instruments are mounted to damping mechanisms which are designed to damp out the vibrations so that they do not affect the operation of the instrument. The two types of systems which are currently used for precision instrument damping include active systems and passive systems. Active systems use a combination of actuators and sensors to create "anti-vibrations" that are intended to exactly cancel out the unwanted vibrations present in the system. While these systems can be very effective in damping low level vibrations, they tend to be very massive, complex and expensive to develop and operate. Furthermore, they require valuable spacecraft power to operate and, due to their increased complexity, are not extremely reliable or stable.

Passive systems use some form of physical behavior, such as material damping or turbulent fluid flow, to transform the vibrational energy into heat energy. While these systems are less complex and less expensive than active systems, they cannot currently provide the high performance of active systems; they cannot be reconfigured once the spacecraft is launched; and the performance of material or fluid based passive systems are very sensitive to the ambient temperature.

While friction in space structure joints has long been recognized as a dominant source of dissipation in precision structures, it has not been used as an intentional passive source of vibration damping. The three main reasons for this are: 1) it is difficult to predict and control the levels of damping due to friction in structural joints; 2) loss factors due to friction are generally limited to 1–5%; and 3) any dissipation due to friction can be accompanied by large nonlinearities in the structural dynamics, making the active control of the structure more difficult.

SUMMARY OF INVENTION

It is therefore an object of this invention to provide a system which effectively dampens vibrations.

It is a further object of this invention to provide such a system that is very effective at low levels of vibrational amplitude.

It is a further object of this invention to provide such a system which is passive and therefore requires no power source.

It is a further object of this invention to provide such a system which uses friction as a damping force.

It is a further object of this invention to provide higher levels of damping than is currently available in passive systems.

It is a further object of this invention to provide better damping at low levels of motion than is currently available in passive systems.

It is a further object of this invention to provide such a system which is not sensitive to temperature variations.

It is yet a further object of the invention to provide such a system which is simple and inexpensive to manufacture and use.

It is a further object of this invention to provide a system that does not introduce unwanted non-linear dynamics.

The invention results from the realization that a combination of frictional dissipative devices can be used to effectively dampen vibrations associated with optical instruments on spacecraft. The combination of frictional dissipative devices can be used to dampen vibrations in the vertical and horizontal planes of a mounting platform for a support strut of an optical instrument, which mounting plate is frictionally engaged by the frictional dissipative devices.

This invention features a damping system including a housing that receives vibrations, a mounting platform movably disposed with respect to the housing, at least one bearing surface on or attached to one of the housing and the platform and at least one frictional member on or attached to the other of the housing and the platform in contact with the bearing surface. The system frictionally dampens vibrations received by the housing and isolates the platform from vibrations.

In a preferred embodiment, the bearing surface may be flat and the frictional member may be spherical. The bearing surface may be disposed on the mounting platform and the spherical frictional member may be disposed on the housing. The housing may have first and second sets of opposing interior walls which cooperate to define a periphery of a cavity therebetween, the spherical frictional member being mounted to at least one of the walls of the first set of opposing interior walls. The mounting platform may be frictionally engaged with the spherical frictional member within the cavity, wherein the mounting platform may be adapted for mounting a support strut thereto. The damping system may further include a pair of opposing spherical frictional members, each mounted to one of the walls of the first set of opposing interior walls, and the mounting platform may be frictionally mounted between the spherical frictional members. Each of the walls of the first set of opposing interior walls may include a spring mechanism disposed between each wall and the associated spherical frictional member, for biasing each spherical frictional member against the mounting platform. The housing may further include a first plate and a second plate mounted in a perpendicular relationship to the opposed interior walls thereby defining a bottom and top, respectively, of the cavity. The second plate may include an aperture to allow the support strut to be mounted to the mounting platform through the second plate. The damping system may further include means for biasing the mounting platform between the first and second plates including spherical devices, which may be ball bearings, disposed between each of the first and second plates and the mounting platform. The second plate may be adjustably mounted to the housing, thereby enabling a bias force between the spherical devices and the mounting platform to be adjusted. Each of the spring mechanisms may include a leaf spring integrated into each of the walls proximate the spherical frictional member and the cavity and the mounting platform may be rectangular in shape. The damping system may further include means for maintaining the relative position of the spherical devices within the cavity.

This invention also features a damping system including a housing that receives vibrations, a damping platform movably disposed within the housing and means for isolating the platform from vibrations received by the housing. The isolating means includes a plurality of ball bearings mounted between the damping platform and an upper interior surface of the housing and a plurality of ball bearings mounted between the damping platform and a lower interior surface of the housing.

This invention also features a damping system for reducing vibration in an instrument having at least one support strut, the damping system a housing having first and second sets of opposing interior walls which cooperate to define a periphery of a cavity therebetween, a mounting platform disposed within the cavity, the mounting platform being adapted for mounting a support strut thereto and a spherical contact coupled to each of the walls of the first set of opposing interior walls in frictional engagement with the mounting platform for reducing vibrations transferred to the mounting platform by the housing.

In a preferred embodiment, each of the walls of the first set of opposing interior walls may include a spring mechanism which operates to bias each spherical contact against the mounting platform. The housing may further include a first plate and a second plate mounted in a perpendicular relationship to the opposed interior walls thereby defining a bottom and top, respectively, of the cavity, the second plate including an aperture to allow the support strut to be mounted to the mounting platform through the second plate. Four spherical devices, such as ball bearings, may be disposed between each of the first and second plates and the mounting platform. The second plate may be adjustably mounted to the housing, thereby enabling a bias force between the spherical devices and the mounting platform to be adjusted. The spring mechanism may include a leaf spring integrated into each of the walls proximate the spherical contact. The cavity and the mounting platform may be rectangular in shape, and the device may include a device for maintaining the relative position of the spherical devices within the cavity.

BRIEF DESCRIPTION OF THE DRAWINGS

Other objects, features and advantages will occur to those skilled in the art from the following description of a preferred embodiment and the accompanying drawings, in which.

DISCLOSURE OF PREFERRED EMBODIMENT

Figure 1:
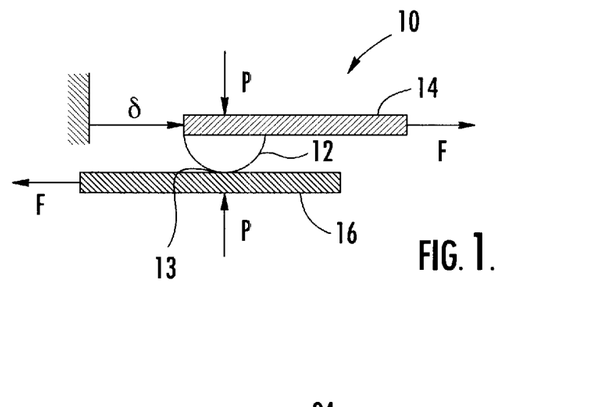
FIG. 1 is a schematic diagram showing a sliding sphere element in accordance with this invention.
Figure 2:
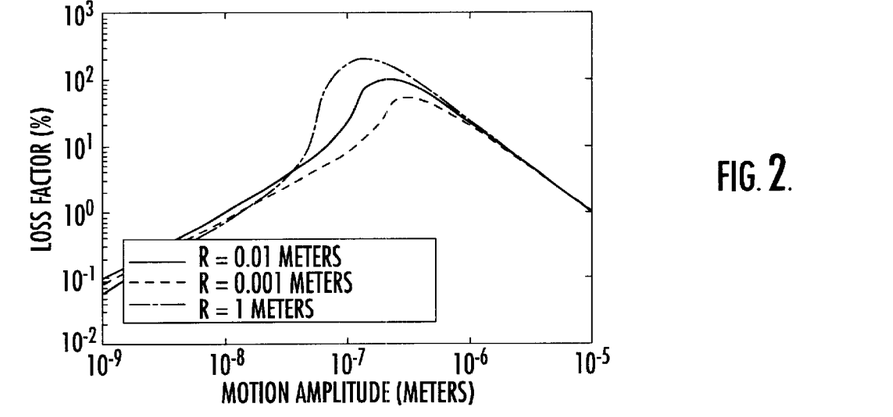
FIG. 2 is a graph which shows the effect of varying the radius of the sliding sphere in accordance with this invention.
Figure 3:
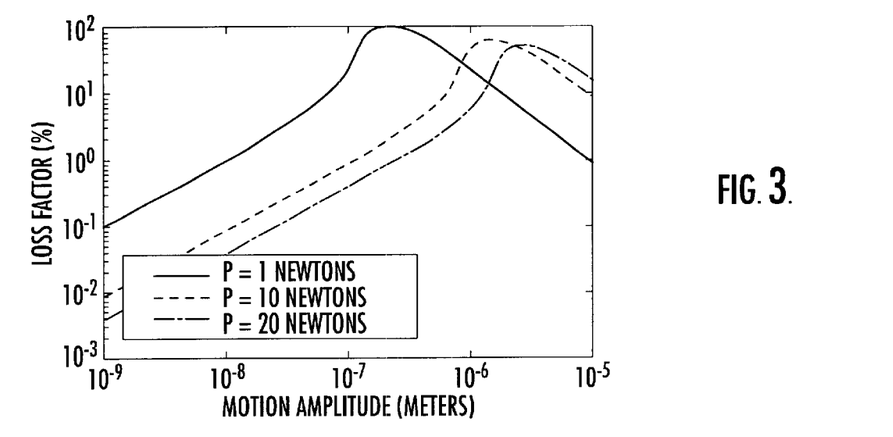
FIG. 3 is a graph which shows the effect of varying the preload of the sliding sphere in accordance with this invention.

Referring now to FIGS. 1–3, the underlying physics which define the operation of the present invention will be described. FIG. 1 is a schematic diagram of a sliding sphere element 10. Sliding sphere element 10 includes a spherical element 12 mounted to a beam 14, the spherical element 12 being biased against the bearing surface 13 of plane 16 by a pressure P and being slideable along plane 16. Throughout the specification, the elements and contacts that are described as being spherical are not necessarily entire spheres, and preferably comprise only a segment of a sphere.

When the spherical element 12 is slid from an initial state in which there is no shear stress, the entire contact patch of the spherical element 12 is motionless relative to the plane 16. Sliding begins at the edges of the contact patch and, as the spherical element 12 is slid, the area of sliding contact grows inwardly in a circular annulus. When the sphere is stopped and the motion is reversed compliance of the spherical element 12 results due to the complete stickage of the contact patch to the plane 16. Sliding then develops again in growing and shrinking annuli within the contact patch. The elastic compliance at initiation and at the reversal point is, from theory of elasticity, equal. In both cases, it is the same as the compliance of the contact patch with zero slippage across the boundary.

The ability of the sliding sphere element 10 to dissipate vibrations, also called the loss factor of the sliding sphere 10, can depend on several variables. First, varying the radius of the spherical element 12 will effect the loss factor of the sliding sphere 10. FIG. 2 is a graph which shows the loss factor associated with sliding sphere elements having radii of 0.01 meters, 0.001 meters, and 1 meter. As can be seen from the graph, the larger the radius of the sphere, the larger the loss factor is in response to vibrations on the micron level. The second variable which effects the dissipation ability of the sliding sphere element 10 is the preload applied between the spherical element 12 and the plane 16. FIG. 3 is a graph which shows the effect of a 1 Newton, 10 Newton and 20 Newton preload on the loss factor of the sliding sphere element. As can be seen in FIG. 3, greater preload amounts enable the sliding sphere element to dampen vibrations of larger amplitude. Accordingly, the effect of increasing preload is to move the location of the peak loss factor to higher amplitudes, primarily due to an increase in the full-slip displacement of the sliding sphere element 10.

Figure 4:
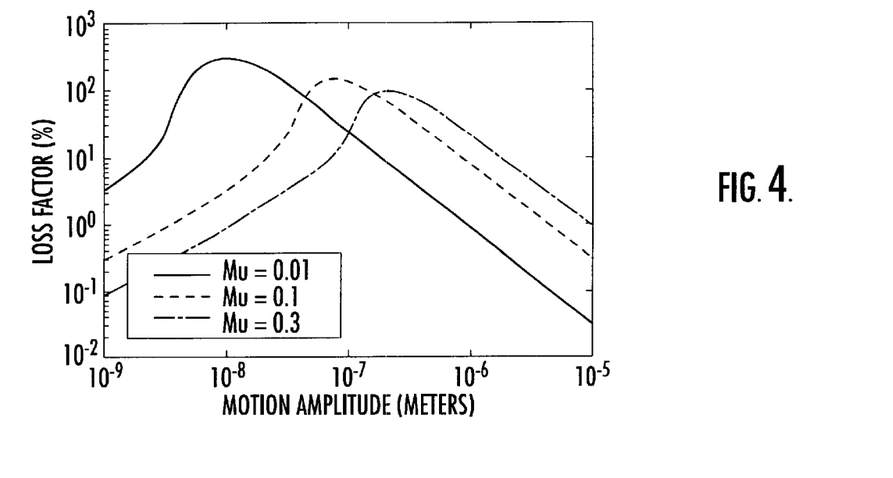
FIG. 4 is a graph which shows the effect of varying the coefficient of friction of the sliding sphere in accordance with this invention.

As described above, the sliding sphere element 10 is capable of high loss factors in response to motion at the micron level. Below this level of motion the damping is more modest, and comparable to other passive damping approaches. The location of the peak loss factor is determined primarily by the displacement at which the spherical. element 12 becomes completely slipped. As shown in FIG. 3, a lower preload applied to the sliding sphere element results in a lower peak loss factor displacement. However, it has been found that a preload below 1 Newton may not be practical. As an alternative to reducing the preload, a third variable which is the coefficient of friction between the sliding spherical element 12 and the plate 16 can affect the loss factor. A range of coefficients of friction from 0.01 to 0.1 is practical on the loss factor in conjunction with the present invention. The coefficient of friction may be adjusted in the present invention by the use of a dry lubricant, such: as molybdenum di-sulfide. FIG. 4 is a graph which shows the effect on the loss factor of varying the coefficient of friction associated with the sliding sphere element 10.

Figure 5:
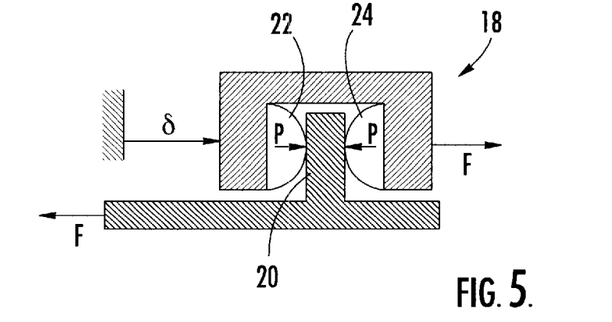
FIG. 5 is a schematic diagram showing a spherical compression element in accordance with this invention.

A second element after which the present invention is modeled is a spherical compression element 18, which is schematically shown in FIG. 5. The spherical compression element 18 is mechanically represented as a tang 20 which is restrained between two opposing spherical elements 22 and 24. The stiffness of such an element 18 is continuous even for complete loading and unloading of the spheres. However, the friction loss for such a normally loaded sphere is zero. For this reason, the spherical compression element 18 can be used as a nonlinear stiffness, allowing small motions but constraining large motions.

Figure 6:
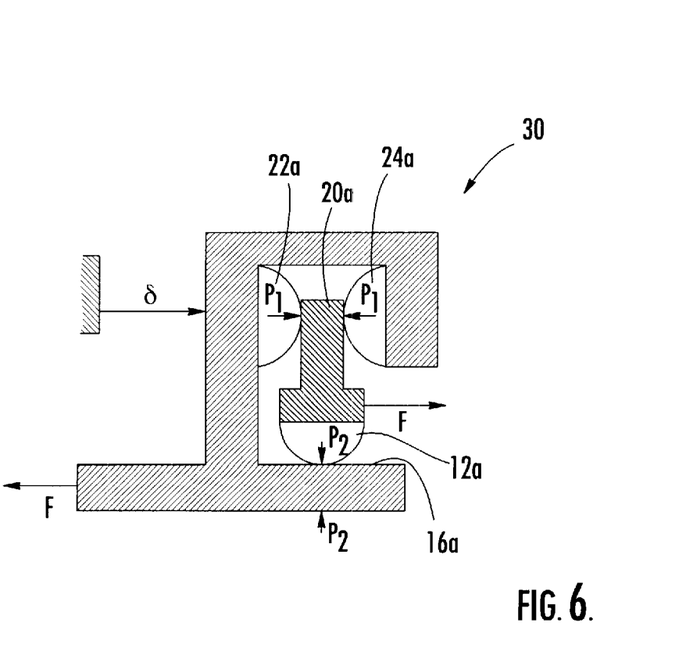
FIG. 6 is a schematic diagram showing a combination of the sliding sphere element of FIG. 1 and the spherical compression element of FIG. 5.

Based on the above descriptions of the sliding sphere element 10 and a spherical compression element 18, the vibration damping system of the present invention is configured as a combination of these two elements. This combination is schematically shown in FIG. 6, in which a tang 20a and spherical elements 22a and 24a represent the spherical compression element 18 and spherical element 12a and plane 16a represent the sliding sphere element 10. This configuration utilizes the advantages of both the sliding sphere element 10 and the spherical compression element 18 in order to dampen vibrations in the micron range. As discussed above, at small motions, the spherical compression element provides little or no constraint. At these levels of motion, the sliding sphere element provides both stiffness and vibration dissipation. For large motions, the spherical compression element provides constraint, and the stiffness of the vibration damping system is increased. Thus, the system 30 is dissipative for intermediate motion levels, but is nearly linear at both small and large motions. Note, however, that in some embodiments, spherical elements 22a and 24a could be spaced from tang 20a to allow both micro slippage of spherical element 12a on bearing surface 16a and then gross slippage of spherical element 12a on bearing surface 16a.

Figure 7:
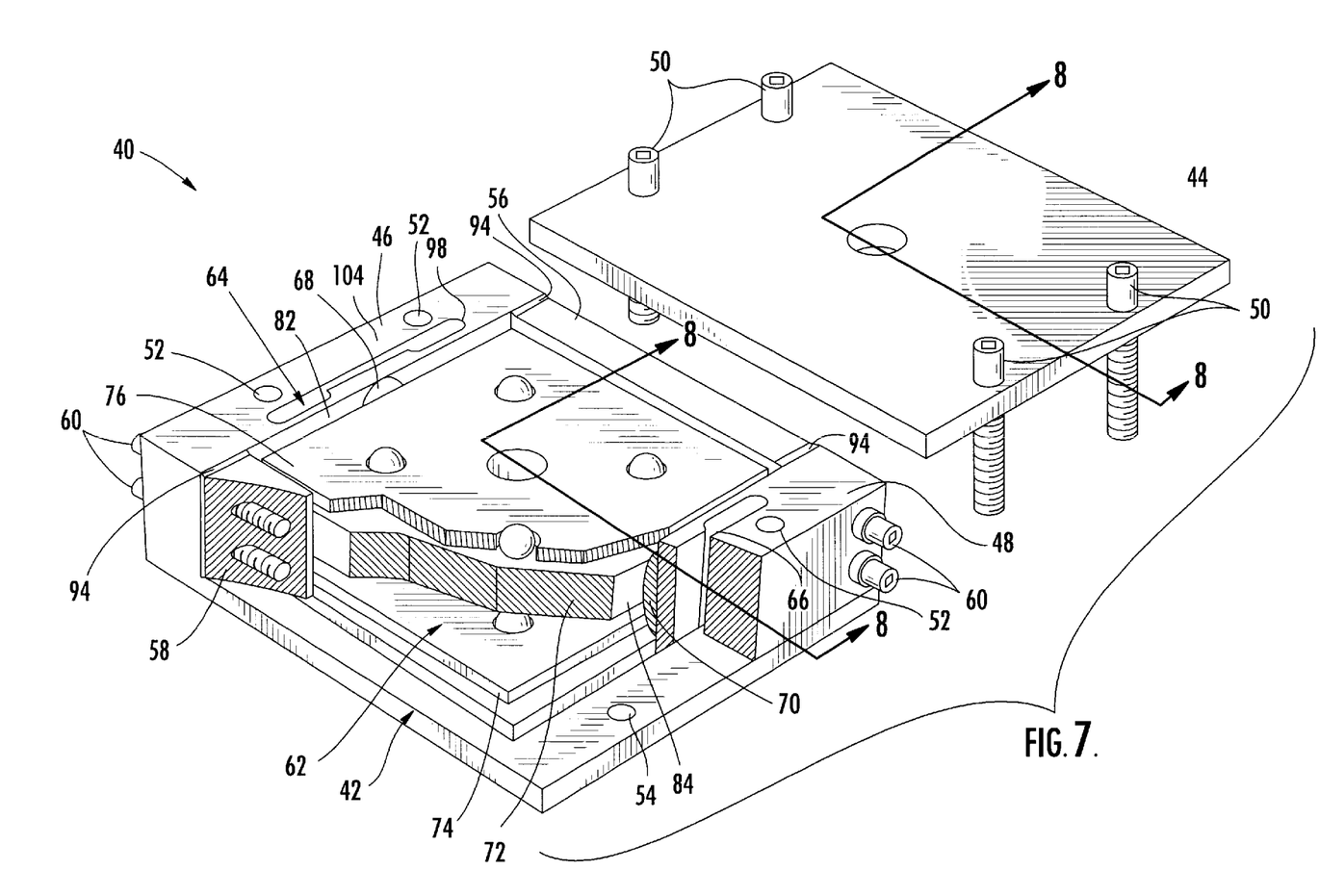
FIG. 7 is a three-dimensional view of the damper assembly in accordance with this invention.
Figure 8:
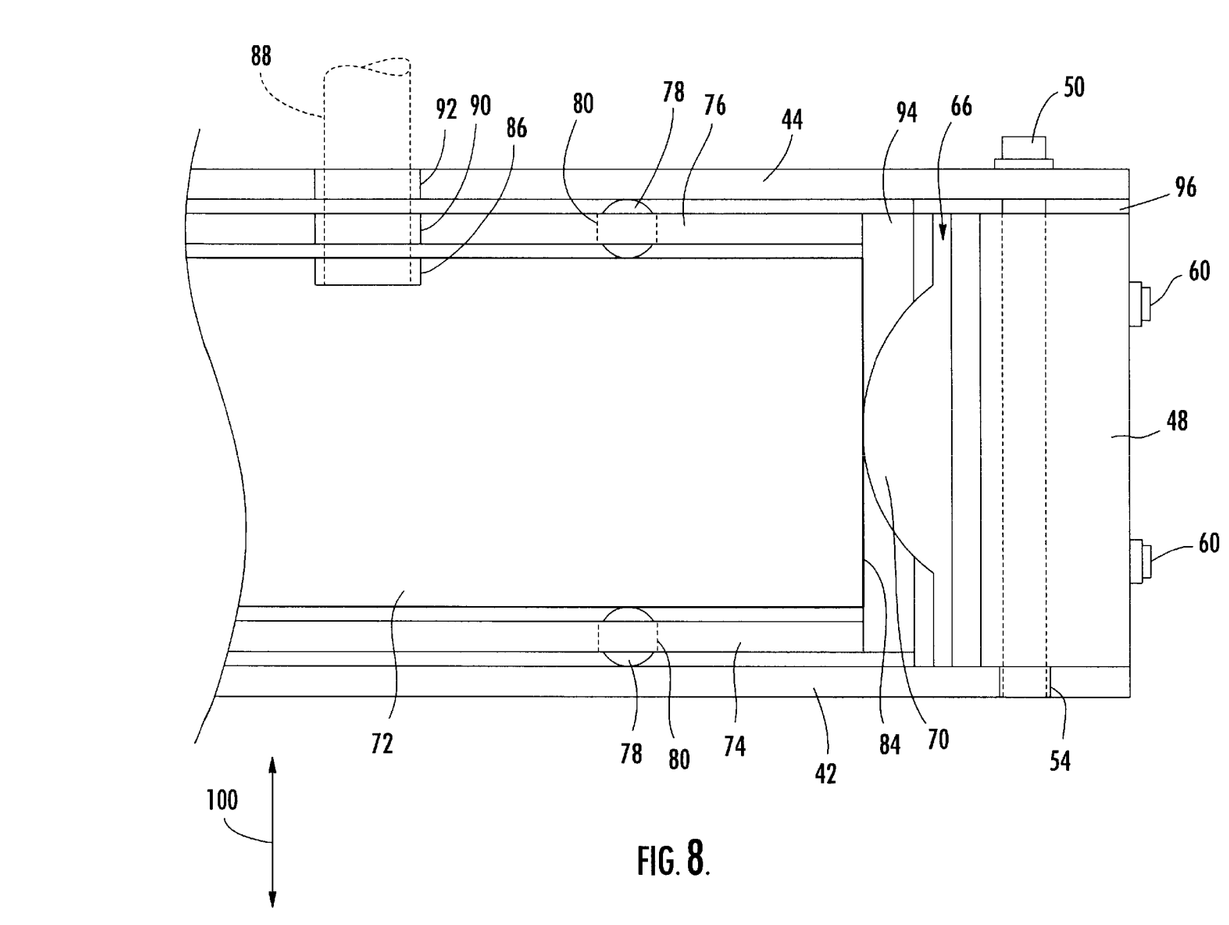
FIG. 8 is a cross-sectional partial view of the high precision damper taken along line 8—8 of FIG. 4.
Figure 9:
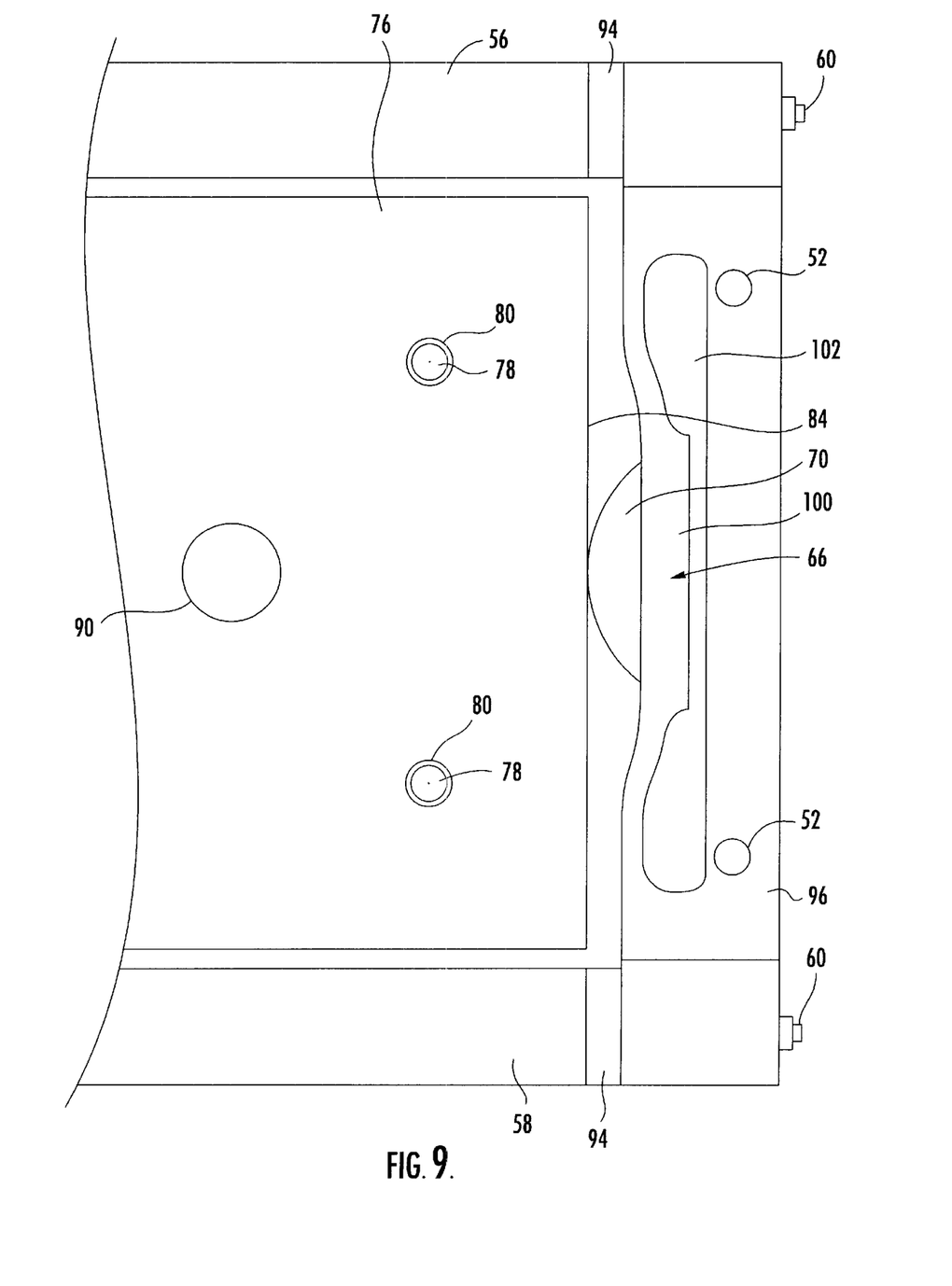
FIG. 9 is a partial top view of the high precision damper of FIG. 4, with the top plate removed.

The preferred embodiment of the present invention will now be described with reference to FIG. 7 which is a three-dimensional view of a vibration damping system 40 in which a portion of the system 40 is cut away in order to show the interior portions of the assembly more clearly; FIG. 8, which is a partial cross-sectional diagram, taken along line 8—8 in FIG. 7; and FIG. 9, which is a partial top view of the system 40 with the top plate 44 removed. Although in FIGS. 8 and 9 only a portion of the system is shown, since the system is symmetrical about its center, it will be understood that the unshown portions are mirror images of shown portions and therefore need not be described. System 40 includes a bottom plate 42 and a top plate 44. A first pair of opposing walls 46 and 48 are mounted between the bottom plate 42 and the top plate 44 by a number of bolts 50 which are inserted through holes 52 in walls 46 and 48 and threaded into holes 54 in bottom plate 42. A second set of opposing walls 56 and 58 are mounted between the first set of opposing walls and 46 and 48 by a number of bolts 60. The first set of opposing walls 46 and 48 and the second set of opposing walls 56 and 58 cooperate to define an interior cavity 62 therebetween. Each of opposing walls 46 and 48 include a flexure spring device 64 and 66, respectfully. Each flexure device 64 and 66 includes a spherical contact 68 and 70, respectively, mounted at a midpoint of the flexure device. In the preferred embodiment, the effective radius of spherical contacts 68 and 70 is one meter. In other words, if spherical contacts 68 and 70 were full spheres, the radius would be one meter. Located within interior cavity 62 are a mounting platform 72, a lower spacer plate 74, disposed between the mounting platform 72 and the lower plate 42, an upper spacer plate 76 mounted between the mounting platform 72 and the upper plate 44 and a number of ball bearings 78 disposed between the mounting platform 72 and lower and upper plates 42 and 44. Ball bearings 78 are disposed within holes 80 in lower spacer plate 74 and upper spacer plate 76 in order to maintain the relative positioning of the ball bearings 78. Mounting platform 72 includes a pair of bearing surfaces 82 and 84 on opposite sides thereof, the bearing surfaces 82 and 84 being frictionally engaged with each of the spherical contacts 68 and 70 respectively. Mounting platform 72 includes a mount 86 into which a strut of an optical instrument, shown in phantom at 88 in FIG. 8 is mounted, preferably by a threaded connection. Upper spacer plate 76 includes an aperture 90 and upper plate 44 includes an aperture 92 which cooperate to allow the strut 88 to pass therethrough. System 40 also includes flexure shims 94 disposed between each of the first opposing walls 46 and 48 and the second opposing walls 56 and 58. Top shims 96 are disposed between each of the first pair of opposing walls 46 and 48 and the top plate Referring now to FIG. 9, flexure device 66 will be described in greater detail. As can be seen in FIG. 9, flexure device 66 includes a mono-leaf member 100 which is formed by milling an aperture 102 in the side wall 48. Although not shown in FIG. 9, flexure device 64 includes a mono-leaf spring 104 formed in wall 46 in a similar manner. Flexure devices 66 and 64 operate to force spherical contacts 68 and 70 into bearing surfaces 82 and 84 respectively. The amount of preload applied to the bearing surfaces 82 and 84 by the spherical contacts 68 and 70 is defined by the thickness of the flexure shims 94. As shown in FIG. 9, the flexure shims 94 define a distance between the flexure device 66 and the bearing surface 84. Therefore, thicker flexure shims 94 will move the flexure device away from the bearing surface 84, thereby reducing the preload and thinner flexure shims 94 will move the flexure device 66 closer to the bearing surface 84, thereby increasing the preload applied to the bearing surface 84 by the spherical contact 70.

Referring back to FIG. 8, it can be seen that the shims 96 and 98, which are respectively disposed between the flexure devices 64 and 66 and the top plate 44, define the amount of preload applied to the ball bearings 78 by the top plate 44. Again, thicker shims 96 and 98 will decrease the amount of preload applied to the mounting plate through the ball bearings 78 and thinner shims 96 and 98 will increase the preload applied to the mounting platform 72 through the ball bearings 78.

The entire system 40 is mounted to a moving object such as a spacecraft, and an optical instrument is mounted to the system 40 via the strut 88 as shown in FIG. 8. The assembly 40 operates to different vibrations which occur perpendicular to the mounting platform 72, or in the direction parallel to the longitudinal axis of the strut 88.

Accordingly, when the system 40 receives vibrations in the direction of the arrow indicated by reference numeral 100, FIG. 8, the system 40 acts to dampen these vibrations, thereby isolating the strut 88 from the vibrations. At very small levels of motion, the spherical contacts 68 and 70 interact with their respective bearing surfaces 82 and 84 to respond to the vibrations in the same manner as the spherical element 12 reacts to the plane 16 in the spherical slide element 10 described with reference to FIG. 1. The mounting platform 72 and ball bearings 78 react to vibrations in an identical manner as the spherical elements 22 and 24 react to the tang 20 in the spherical compression element 18 described with reference to FIG. 5. Accordingly, at small motions, the sliding sphere element of the system 40 provides both stiffness and dissipation while the spherical compression element of assembly 40 provides little or no constraint. For large levels of motion, the spherical compression element provides constraint and the stiffness of the assembly 40 approaches that of the strut 88. Thus, the micro damping assembly 40 is dissipitive for intermediate motion levels, but is merely linear at both small and large motions.

Figure 10:
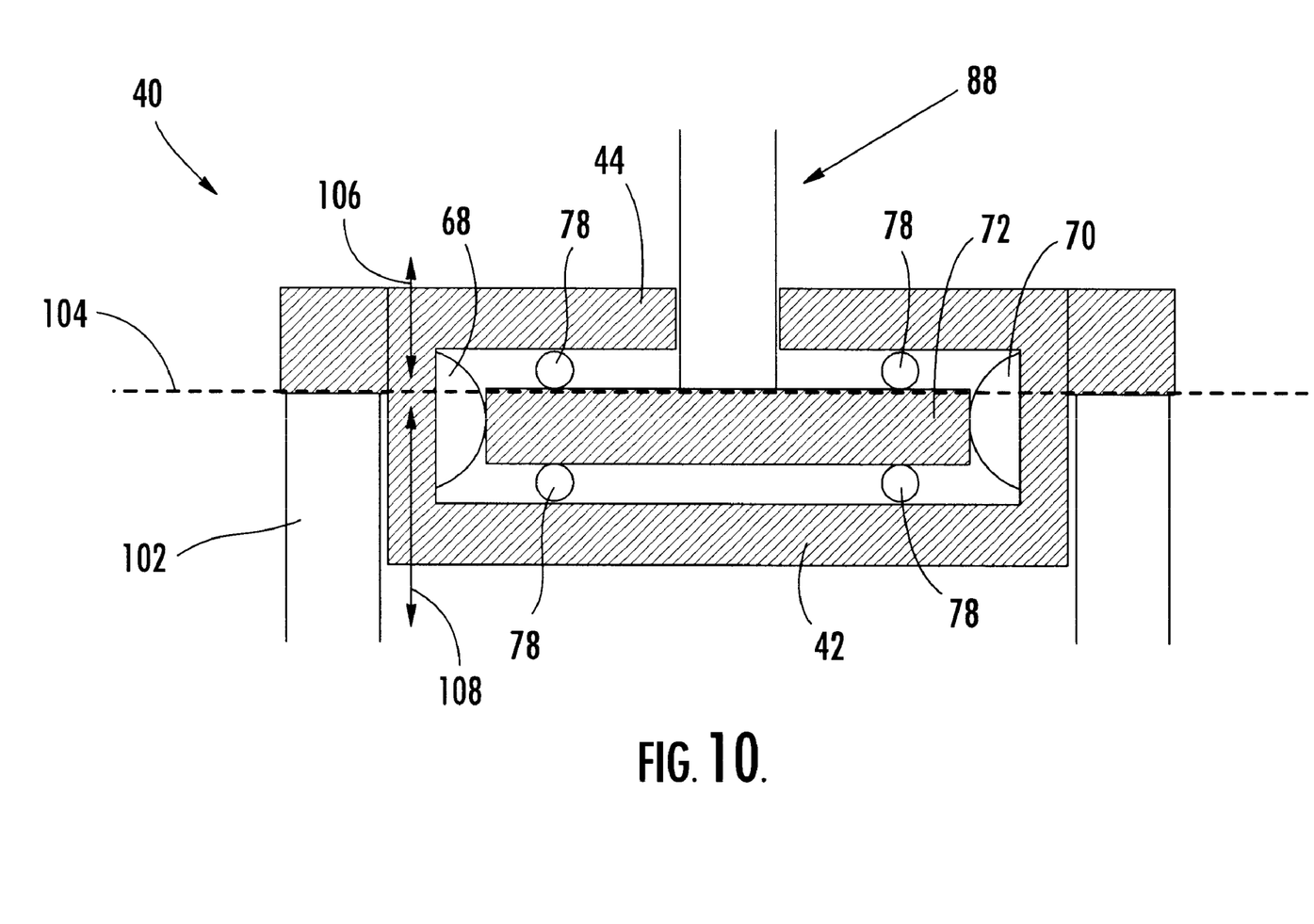
FIG. 10 is a cross sectional view of one embodiment of the high precision damper assembly in accordance with this invention.

Referring now to FIG. 10, the temperature stability of the system 40 will be described. FIG. 10 is a schematic drawing showing the system 40 mounted to mounts 102 which in turn are attached to an object which receives vibrations, such as a spacecraft. In the preferred embodiment, the components of the system 40 are constructed out of steel and the strut 88 is constructed of low coefficient of thermal expansion (CTE) materials. As shown in FIG. 10, the center of thermal expansion of the assembly 40 is indicated at dotted line 104. Accordingly, during changes in temperature, the steel components will contract or expand uniformly about the center of thermal expansion 104 as indicated by arrows 106 and 108. Therefore, since the steel components contract or expand uniformly across the center of thermal expansion 104, the preload across the interfaces does not change.

Figure 11:
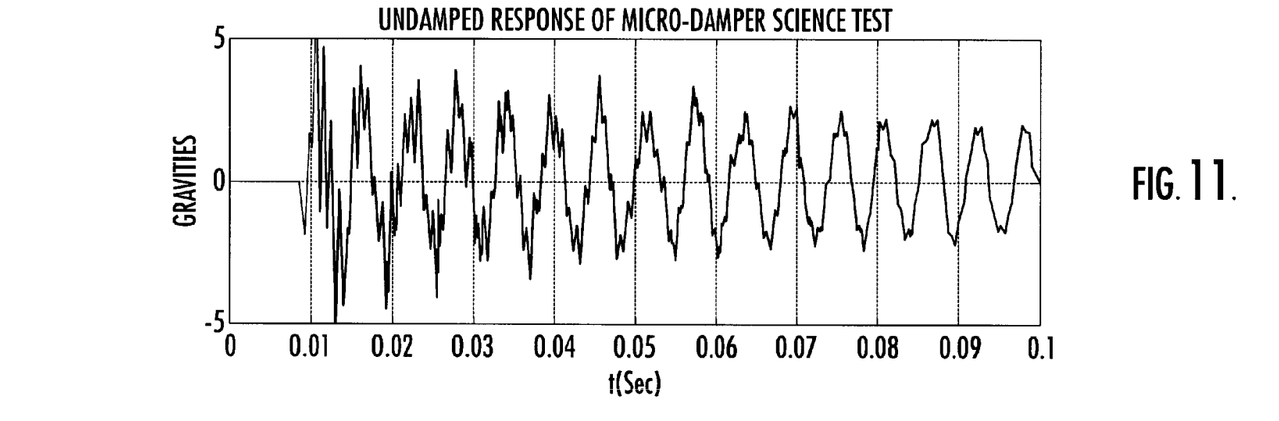
FIG. 11 is a graph which shows the response of a traditionally damped system to an impulse.
Figure 12:
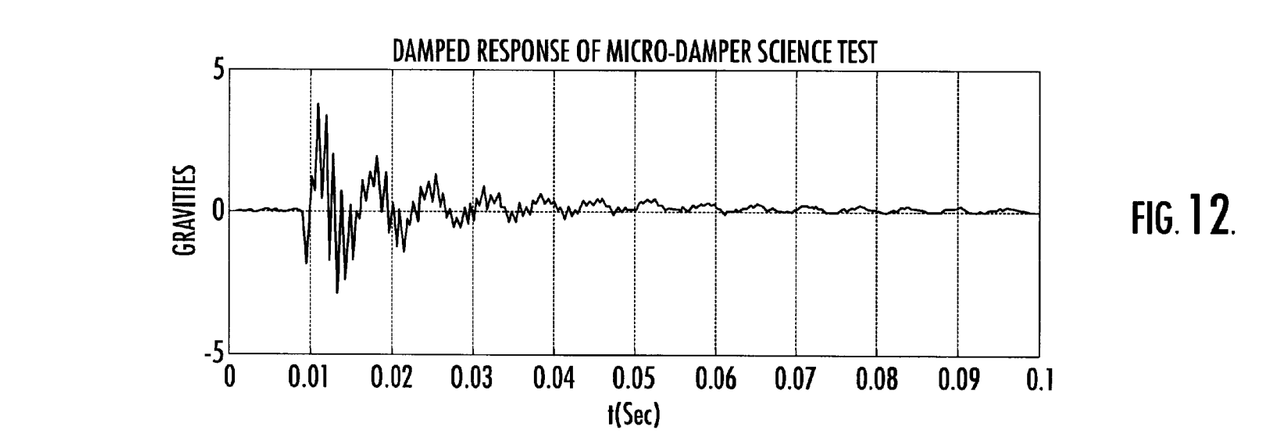
FIG. 12 is a graph which shows the improved response of this present invention to an impulse.

Referring now to FIGS. 11–14, the effect of the assembly 40 on low level of motion vibrations will be described. FIG. 11 is a graph which shows the impulse response of a system which does not incorporate the high precision damping system of the present invention, while FIG. 12 is a graph which shows the response of a system to the same impulse when it is mounted to the damper system 40. The undamped system demonstrates a material damping profile with a loss factor of approximately 0.5 percent, FIG. 11, while the damped system exhibits passing damping levels as high as 20 percent, FIG. 12, thus greatly reducing the vibration experienced by an optical instrument attached to the system 40.

Figure 13:
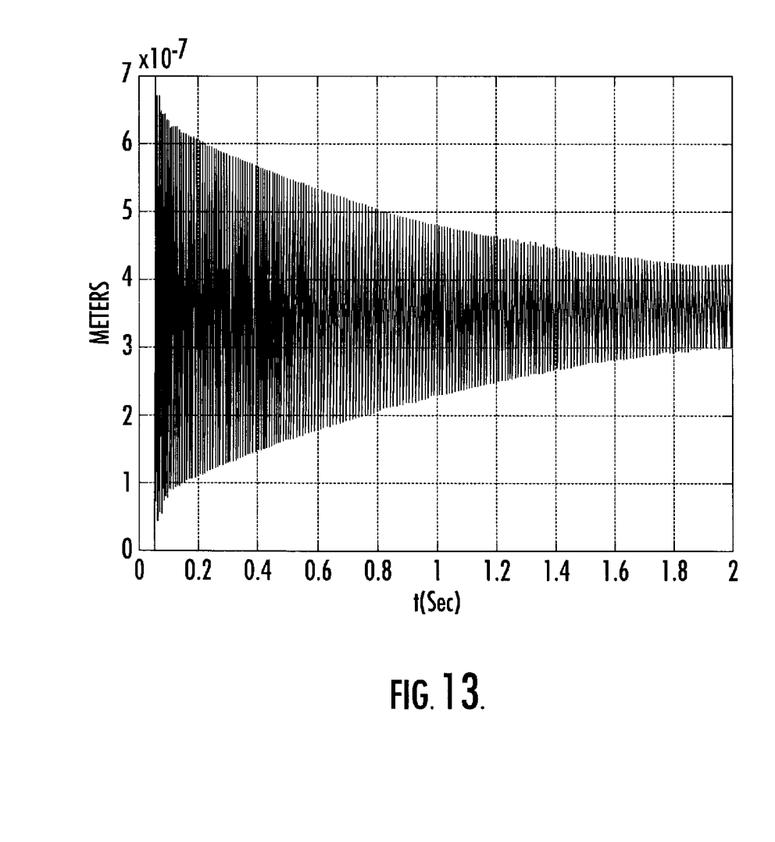
FIG. 13 is a graph which shows the dynamic response of a conventional passive damper to a one Newton step function.
Figure 14:
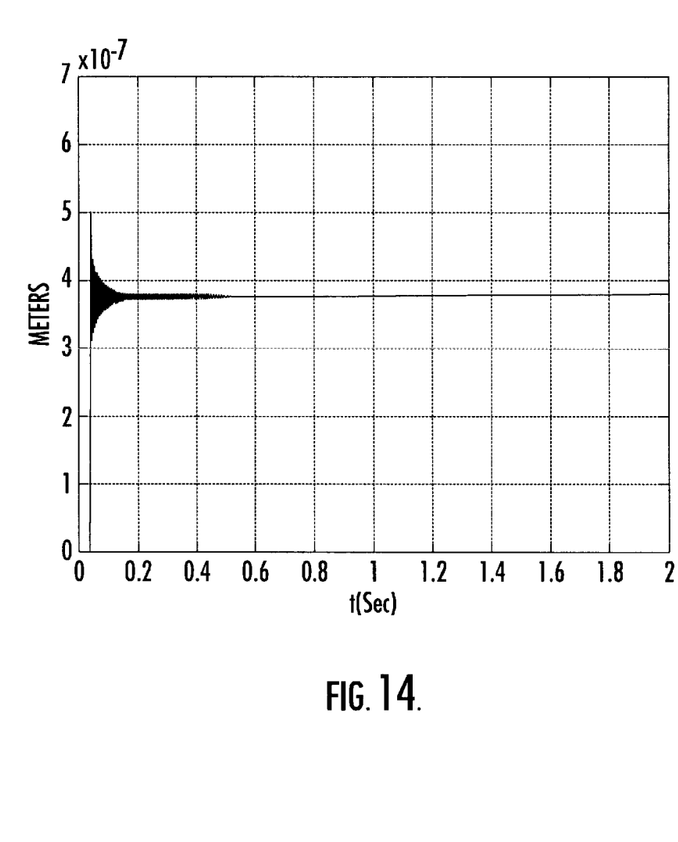
FIG. 14 is a graph which shows the dynamic response of the high precision damper of this invention to a one Newton step function.

Similarly, FIG. 13 is a graph which shows the dynamic response of a conventional passive damper to a one Newton step function and FIG. 14 is a graph which shows the dynamic response of the high precision damper of the present invention to a one Newton step function. Again, it can be seen that the damping system of the present invention greatly reduces the vibrations which may be transferred to an optical instrument thereby degrading the performance of the optical instrument.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A damping system comprising:
   a housing that receives vibrations;
   a mounting platform movably disposed with respect to the housing in a first direction;
   at least one bearing surface on or attached to one of the housing and the mounting platform; and
   at least one frictional sliding member fixed to the other of the housing and the mounting platform, the frictional sliding member extending in a direction orthogonal to the first direction and in contact with the bearing surface and configured to frictionally damp motion forces received by the housing and damping the platform in the first direction.

2. The system of claim 1 wherein the bearing surface is flat.

3. The damping system of claim 2 wherein the frictional sliding member is spherical.

4. The system of claim 3 wherein the bearing surface is disposed on the mounting platform.

5. The damping system of claim 4 wherein the spherical frictional sliding member is disposed on the housing.

6. The damping system of claim 3 wherein:
   said housing has first and second sets of opposing interior walls which cooperate to define a periphery of a cavity therebetween, one spherical frictional sliding member mounted to one of the walls of said first set of opposing interior walls; and
   said mounting platform is frictionally engaged with said spherical frictional sliding member within said cavity, said mounting platform being adapted for mounting a support strut thereto.

7. The damping system of claim 6, including another spherical frictional sliding member mounted to an opposite wall of the first set of opposing interior walls, said mounting platform being frictionally mounted between said spherical frictional sliding members.

8. The damping system of claim 7 wherein each of said walls of said first set of opposing interior walls includes a spring mechanism disposed between each wall and the associated spherical frictional sliding member, for biasing each spherical frictional sliding member against said mounting platform.

9. The damping system of claim 8 in which said housing further includes a first plate and a second plate mounted in a perpendicular relationship to said opposed interior walls thereby defining a bottom and top, respectively, of said cavity, said second plate including an aperture to allow the support strut to be mounted to the mounting platform through said second plate.

10. The damping system of claim 9, further comprising means for biasing the mounting platform between said first and second plates.

11. The damping system of claim 10 wherein the means for biasing includes spherical devices disposed between each of said first and second plates and said mounting platform.

12. The damping system of claim 11 wherein said spherical devices are ball bearings.

13. The damping system of claim 11 wherein said second plate is adjustably mounted to said housing, thereby enabling a bias force between said spherical devices and said mounting platform to be adjusted.

14. The damping system of claim 8 wherein each of said spring mechanisms includes a leaf spring integrated into each of said walls proximate said spherical frictional sliding member.

15. The damping system of claim 6 wherein said cavity and said mounting platform are rectangular in shape.

16. The damping system of claim 5 further including means for maintaining the relative position of said spherical devices within said cavity.

17. A damping system comprising:
a housing that receives vibrations, the housing including a plurality of interior walls and upper and lower interior surfaces;
a damping platform movably disposed within the housing in a first direction;
a plurality of ball bearings mounted between said damping platform and the upper interior surface of the housing and a plurality of ball bearings mounted between the damping platform and the lower interior surface of said housing; and
at least two interior walls of the housing each including a frictional sliding member fixed thereto, said frictional sliding member extending in a direction orthogonal to the first direction, said damping platform frictionally engaged with said frictional sliding members.

18. The damping system of claim 17 wherein said fictional sliding members are spherical.

19. The damping system of claim 18 wherein each of said opposing interior walls includes a spring mechanism disposed between each wall and the associated frictional sliding member, for biasing each frictional sliding member against said damping platform.

20. A damping system for reducing vibration in an instrument having at least one support strut, the damping system comprising:
a housing having first and second sets of opposing interior walls which cooperate to define a periphery of a cavity therebetween;
a mounting platform disposed within said cavity, said mounting platform movable in a first direction and adapted for mounting a support strut thereto; and
a spherical contact fixed to each of the walls of said first set of opposing interior walls and in frictional engagement with said mounting platform and extending in a direction orthogonal to the first direction and configured to reduce vibrations transferred to said mounting platform by said housing in the first direction.

21. The damping system of claim 20 wherein each of said walls of said first set of opposing interior walls includes a spring mechanism which biases each spherical contact against said mounting platform.

22. The damping system of claim 21 said housing further including a first plate and a second plate mounted in a perpendicular relationship to said opposed interior walls thereby defining a bottom and top, respectively, of said cavity, and second plate including an aperture to allow the support strut to be mounted to the mounting platform through said second plate.

23. The damping system of claim 22, further comprising a plurality of spherical devices biasedly engaged between said mounting platform and said first and second plates.

24. The damping system of claim 23 wherein four spherical devices are disposed between each of said first and second plates and said mounting platform.

25. The damping system of claim 23 wherein said spherical devices are ball bearings.

26. The damping system of claim 24 Wherein said second plate is adjustably mounted to said housing, thereby enabling a bias force between said spherical devices and said mounting platform to be adjusted.

27. The damping system of claim 21 wherein said spring mechanism includes a leaf spring integrated into each of said walls proximate said spherical contact.

28. The damping system of claim 21 wherein said cavity and said mounting platform are rectangular in shape.

29. The damping system of claim 23 further including a means for maintaining the relative position of said spherical devices within said cavity.

30. A damping system comprising:
two elements including a first element to be damped with respect to motion of the second element in a first direction;
one of said elements including at least a first spherical frictional member extending in a direction orthogonal to the first direction, the other said element including at least a first bearing surface in contact with the first spherical frictional member defining a contact patch which grows in size as a result of the magnitude of forces acting on one or both of the elements.

31. The damping system of claim 30 in which the element including the first spherical frictional member also includes a second bearing surface and the element including the first bearing surface also includes a second spherical frictional member in contact with the second bearing surface.

32. A damping system comprising:
a housing that receives vibrations;
a mounting platform movably disposed with respect to the housing in a first direction;
at least one bearing surface on or attached to one of the housing and the platform; and
at least one spherical frictional member fixed to the other of the housing and the platform extending in a direction orthogonal to the first direction and in contact with the bearing surface at a tangent on the spherical frictional member configured to frictionally dampen motion forces received by the housing and damping the platform as it moves in the first direction.

33. A damping system comprising:
a housing that receives vibrations;
a mounting platform movably disposed in a first direction with respect to the housing;
at least one bearing surface on or attached to one of the housing and the platform; and
at least one spherical frictional member fixed to the other of the housing and the platform extending in a direction orthogonal to the first direction and in sliding contact with the bearing surface configured to frictionally dampen motion forces received by the housing and damping the platform in the first direction.

34. A damping system comprising:
a housing that receives vibrations;
a mounting platform movably disposed in a first direction with respect to the housing;
at least one bearing surface on or attached to one of the housing and the platform; and
at least one spherical frictional member fixed to the other of the housing and the platform, said spherical frictional member extending in a direction orthogonal to the first direction and preloaded against and in sliding contact with the bearing surface at a tangent and configured to frictionally dampen motion forces received by the housing and damping the platform as it moves in the direction of the tangent, the direction of the tangent being the same as the direction of the first direction.

35. A damping system comprising:

a housing that receives vibrations;

a mounting platform movably disposed with respect to the housing in a first direction;

at least one steel bearing surface on or attached to one of the housing and the platform; and at least one non-rolling, steel, frictional sliding member fixed on or fixedly attached to the other of the housing and the mounting platform, the non-rolling, steel, frictional sliding member extending in a direction orthogonal to the first direction and in contact with the steel bearing surface and configured to frictionally dampen motion forces received by the housing and damping the platform in the first direction.

36. A damping system comprising:

a housing that receives vibrations, said housing comprising opposing interior walls each including a spherical frictional contact;

a damping platform movably disposed within the housing, said damping platform being frictionally engaged between said spherical frictional contacts;

a spring mechanism disposed between each said wall and the associated spherical frictional contact for biasing each spherical friction contact against said damping platform; and a plurality of ball bearings mounted between said damping platform and an upper interior surface of said housing and a plurality of ball bearings mounted between said damping platform and a lower interior surface of said housing.

37. A damping system for reducing vibration in an instrument having at least one support strut, the damping system comprising:

a housing having first and second sets of opposing interior walls which cooperate to define a periphery of a cavity therebetween;

a mounting platform disposed within said cavity, said mounting platform being adapted for mounting a support strut thereto;

a spherical contact coupled to each of the walls of said first set of opposing interior walls in frictional engagement with said mounting platform for reducing vibrations transferred to said mounting platform by said housing; and a leaf spring mechanism spring integrated into each of said walls proximate said spherical contact for biasing each spherical contact against said mounting platform.

38. A damping system comprising:

a housing that receives vibrations;

a mounting platform movably disposed with respect to the housing in a first direction;

at least one steel bearing surface on or attached to one of the housing and the platform; and at least one frictional sliding member fixed to the other of the housing and the mounting platform, the frictional sliding member extending in a direction orthogonal to the first direction and in contact with the steel bearing surface and configured to frictionally dampen motion forces received by the housing and damping the platform in the first direction.

* * * * *

UNITED STATES PATENT AND TRADEMARK OFFICE
CERTIFICATE OF CORRECTION

PATENT NO.    : 6,533,256 B1
DATED         : March 18, 2003
INVENTOR(S)   : Warren et al.

It is certified that error appears in the above-identified patent and that said Letters Patent is hereby corrected as shown below:

Column 1,
Line 5, insert the following:

-- GOVERNMENT INTEREST

This invention was made with Government support under Contract No. NAS3-99061 awarded by NASA. The Government has certain rights in the invention. --

Signed and Sealed this

Twenty-ninth Day of April, 2003

JAMES E. ROGAN
*Director of the United States Patent and Trademark Office*